(12) United States Patent
Agnoli et al.

(10) Patent No.: US 11,604,661 B2
(45) Date of Patent: Mar. 14, 2023

(54) DETERMINING RELEVANT INFORMATION BASED ON THIRD PARTY INFORMATION AND USER INTERACTIONS

(71) Applicant: Apple Inc., Cupertino, CA (US)

(72) Inventors: Giovanni M. Agnoli, San Mateo, CA (US); Matthew J. Sundstrom, Campbell, CA (US); Conrad B. Kramer, San Francisco, CA (US); Kyle T. Howarth, San Jose, CA (US); William C. MacCartney, San Jose, CA (US); Joshua R. Ford, Santa Clara, CA (US); Paul W. Salzman, Palo Alto, CA (US); Ari R. Weinstein, San Francisco, CA (US); Roozbeh Mahdavian, Trubuco Canyon, CA (US); Joshua C. Weinberg, Campbell, CA (US); Jared K. McGann, San Jose, CA (US)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 16/186,348

(22) Filed: Nov. 9, 2018

(65) Prior Publication Data

US 2019/0370029 A1    Dec. 5, 2019

Related U.S. Application Data

(60) Provisional application No. 62/679,887, filed on Jun. 3, 2018.

(51) Int. Cl.
*G06F 9/451* (2018.01)
*G06N 99/00* (2019.01)
(Continued)

(52) U.S. Cl.
CPC ............ *G06F 9/451* (2018.02); *G06F 3/0482* (2013.01); *G06F 16/24578* (2019.01); *G06N 20/00* (2019.01); *G04G 9/007* (2013.01)

(58) Field of Classification Search
CPC .. G06F 9/451; G06F 16/24578; G06F 3/0482; G06F 3/048; G06N 20/00; G06N 3/0454; G06N 7/005; G04G 9/007
See application file for complete search history.

(56) References Cited

U.S. PATENT DOCUMENTS

2014/0334271 A1* 11/2014 Park ...................... G04G 21/08
                                                                368/10
2016/0248863 A1*  8/2016 Tseng .................... H04W 4/21
(Continued)

FOREIGN PATENT DOCUMENTS

WO    WO 2013/081303        6/2013
WO    WO 2017/031089        2/2017
WO    WO-2017031089 A1 *    2/2017  ........... G06F 3/0485

OTHER PUBLICATIONS

International Search Report and Written Opinion from PCT/US/2019/023027, dated Jun. 13, 2019, 14 pages
(Continued)

*Primary Examiner* — Jennifer N Welch
*Assistant Examiner* — Parmanand D Patel
(74) *Attorney, Agent, or Firm* — BakerHostetler (57) ABSTRACT

A system for determining relevant information based on user interactions may include a processor configured to receive application data from one or more applications, the application data including features related to user activity from the one or more applications, the one or more application including applications local to the device that are stored in the memory and applications external to the device. The processor may be further configured to provide, using a machine learning (ML) model, a relevance score for each of
(Continued)

one or more user interface (UI) elements based on each of the features. The processor may be further configured to sort one or more UI elements based on a ranking of the relevance scores. The processor may be further configured to provide, as output, the one or more UI elements based at least in part on the ranking.

20 Claims, 6 Drawing Sheets

(51) Int. Cl.
  *G06F 3/0482* (2013.01)
  *G04G 9/00* (2006.01)
  *G06N 20/00* (2019.01)
  *G06F 16/2457* (2019.01)

(56) References Cited

U.S. PATENT DOCUMENTS

2017/0024391 A1* 1/2017 Steck ............... G06F 16/24578
2018/0107943 A1* 4/2018 White ............... G06Q 10/1093

OTHER PUBLICATIONS

Korean Office Action from Korean Patent Application No. 10-2020-7032972, dated Jun. 22, 2022, 11 pages including English language translation.

European Office Action from European Patent Application No. 19720215.3, dated Jul. 13, 2021, 8 pages.

Australian Notice of Acceptance from Australian Patent Application No. 2019281373, dated Feb. 11, 2022, 3 pages.

Summons to attend oral proceedings from European Patent Application No. 19720215.3, dated Jan. 17, 2023, 9 pages.

* cited by examiner

DETERMINING RELEVANT INFORMATION BASED ON THIRD PARTY INFORMATION AND USER INTERACTIONS

CROSS-REFERENCE TO RELATED APPLICATIONS

The present application claims the benefit of U.S. Provisional Patent Application Ser. No. 62/679,887, entitled "DETERMINING RELEVANT INFORMATION BASED ON THIRD PARTY INFORMATION AND USER INTERACTIONS," filed Jun. 3, 2018, which is hereby incorporated herein by reference in its entirety and made part of the present U.S. Utility patent application for all purposes.

TECHNICAL FIELD

The present description relates generally to determining relevant information based on user interactions, including determining relevant information, such as based on user interactions at the user device.

BACKGROUND

Mobile electronic devices (e.g., watch or smartphone) are popular and are often carried by users while performing daily, and/or recurring, tasks. For example, a user of a mobile electronic device may interact with the device over the day by using mobile applications that are installed locally on the device. The mobile electronic device, however, may have a small screen that limits the amount of information that can be provided to the user at any given time. Thus, if the information provided to a user at any given time is not relevant to the user, the user may need to further interact with the mobile electronic device to find relevant information and/or applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides an architecture that enables determining relevant information at an electronic device using a locally stored machine learning (ML) model that provides relevance scoring and/or ranking of data provided by local (e.g., from applications executing on the electronic device) and external data sources from a different electronic device (e.g., applications executing on the different electronic device). In an example, the relevance scoring is at least based on input signals that describe the user's current environment and/or historical user behavior information. In one or more implementations, the subject system may be implemented by a wearable electronic device (e.g., a smart watch) that works in conjunction with another electronic device (e.g., mobile smartphone), but it is appreciated that the subject technology can be implemented on other types of devices and utilize other types of output formats (e.g. graphical, auditory, etc.).

More specifically, implementations described herein provide a system that enables recommendations (e.g., suggested content and/or suggested future actions) to be provided, using a ML model, based on relevance scoring/ranking of data provided by data sources including third party data sources (e.g., third party applications on a particular electronic device(s)) that donate information to the system using one or more application programming interfaces (APIs). A third party application refers to an application developed by a different entity or developer. As referred to herein, information that is "donated" (or "donations" or "donated information") may refer to or discussed in connection with mechanisms that enable applications to provide information, at least related to user activity within such applications, to the system for at least determining recommendations to the user. In an example, recommendations may be provided in the form of user interface (UI) elements, displayed on a particular electronic device, that indicate suggested actions for the user to perform and/or provide relevant content to the user.

Figure 1:
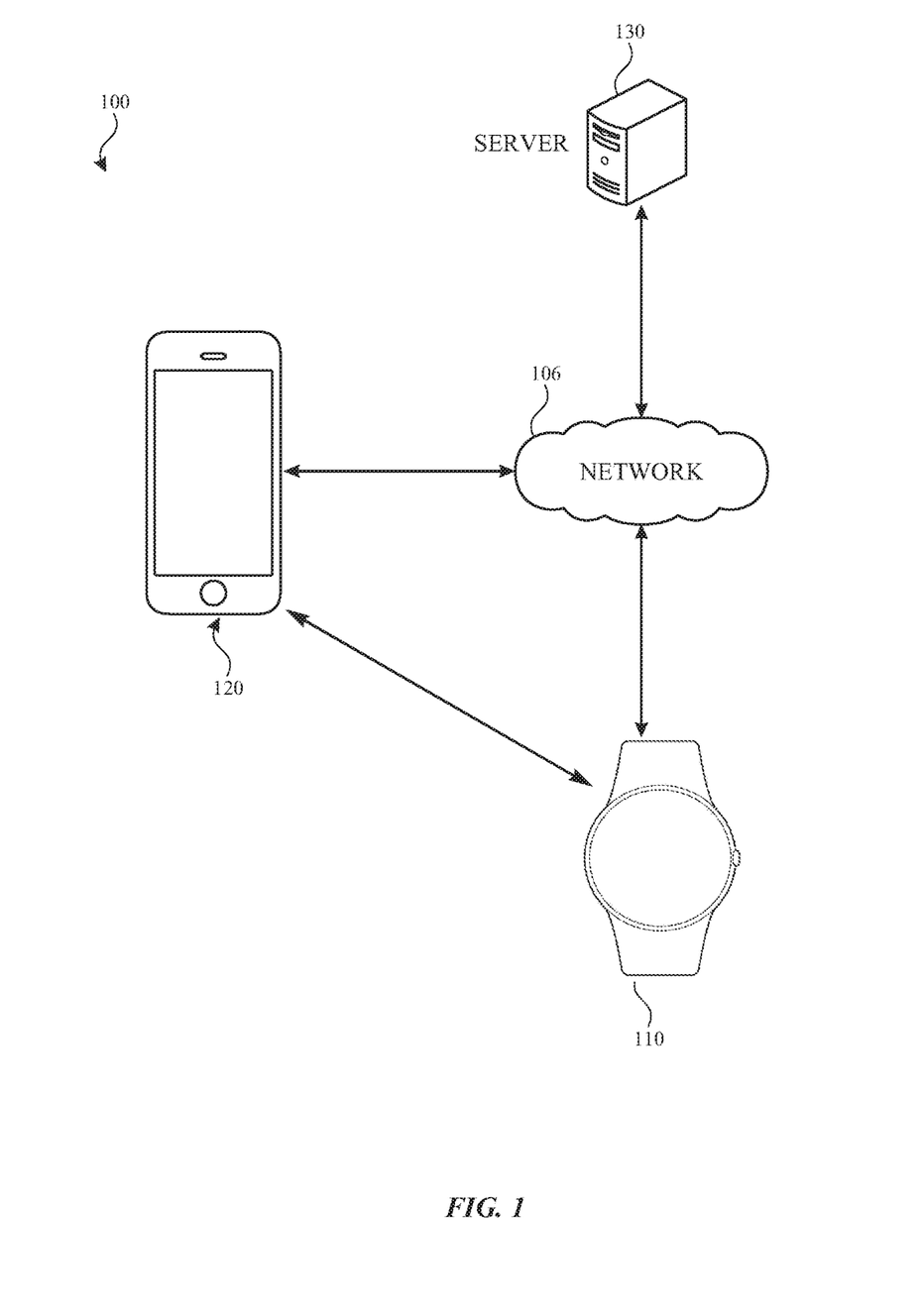
FIG. 1 illustrates an example network environment for providing relevant information based on user interactions in accordance with one or more implementations.

FIG. 1 illustrates an example network environment 100 for providing relevant data to an electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 120, a wearable electronic device 110 and a server 130. The network 106 may communicatively (directly or indirectly) couple, for example, any two or more of the electronic device 120, the wearable electronic device 110, and/or the server 130. In one or more implementations, the network 106 may be an interconnected network of devices that may include, or may be communicatively coupled to, the Internet. For explanatory purposes, the network environment 100 is illustrated in FIG. 1 as including an electronic device 120, a wearable electronic device 110, and a server 130; however, the network environment 100 may include any number of electronic devices and any number of servers.

The server 130 may be part of a network of computers or a group of servers, such as in a cloud computing or data center implementation. The server 130 may store data, such as photos, music, text, web pages and/or content provided therein, etc., that may be accessible on the wearable electronic device 110 and/or the electronic device 120.

The electronic device 120 may be, for example, a portable computing device such as a laptop computer, a smartphone, a peripheral device (e.g., a digital camera, headphones), a tablet device, a smart speaker, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 120 is depicted as a mobile smartphone device. The electronic device 120 may be, and/or may include all or part of, the electronic system discussed below with respect to FIG. 6. The electronic device 120 may communicate with the wearable electronic device 110.

The wearable electronic device 110 may be, for example, a wearable device configured to be worn on a user's arm that includes, for example, one or more wireless interfaces, such as WLAN radios, cellular radios, Bluetooth radios, Zigbee radios, near field communication (NFC) radios, and/or other wireless radios. The wearable electronic device 110 may be, and/or may include all or part of, the electronic device discussed below with respect to FIG. 5.

Although the wearable electronic device 110 is illustrated as being capable of communicating with another device or server using the network 106, in one or more implementations described herein, the wearable electronic device 110 performs operations locally on the device itself to provide relevant data to a user (e.g., without communicating over the network 106 and/or the server 130).

Figure 2:
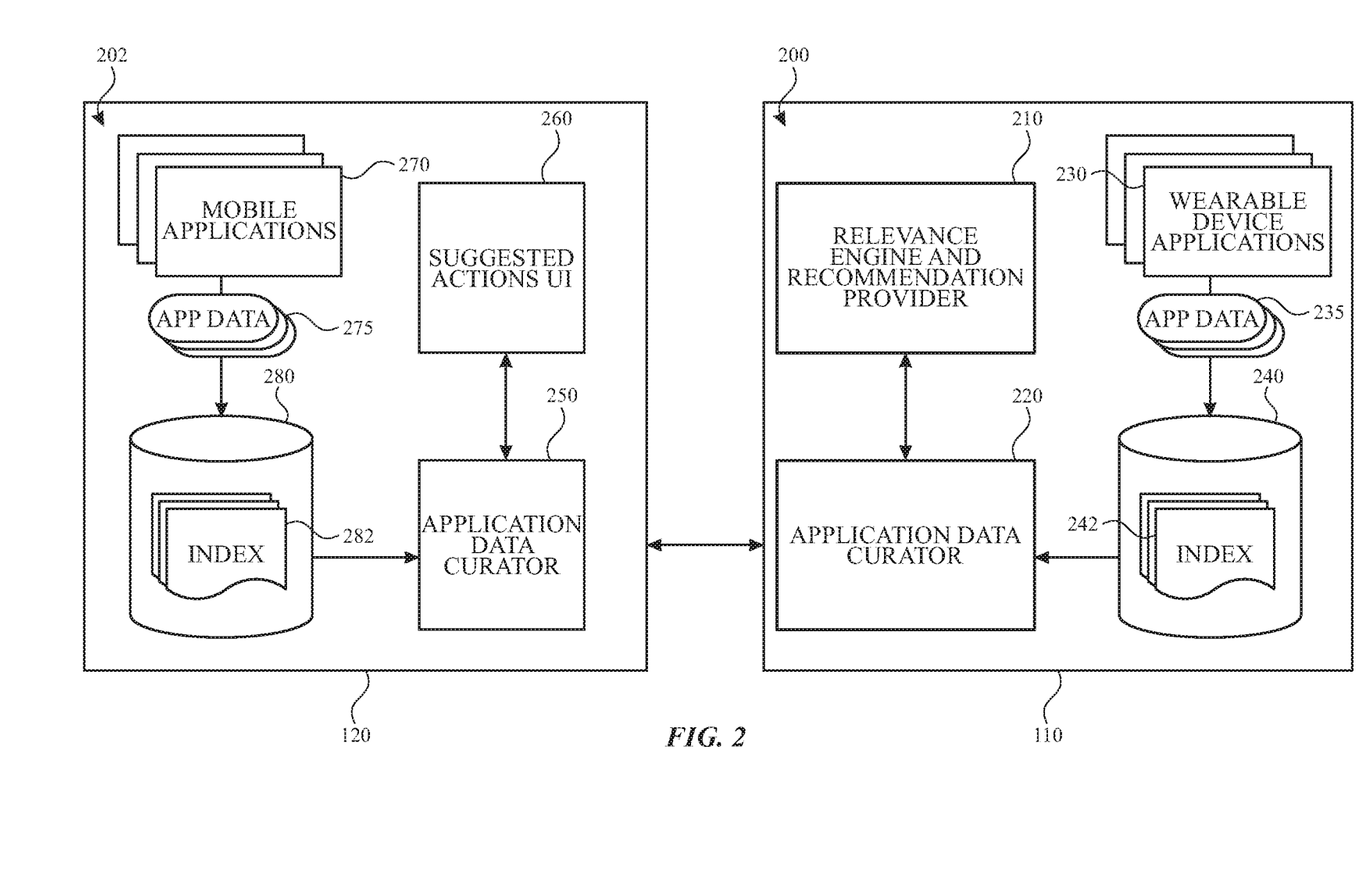
FIG. 2 illustrates an example diagram of an architecture of a system for providing relevant information based on user interactions in accordance with one or more implementations.

FIG. 2 illustrates example architectures 200 and 202 on different electronic devices for determining relevant data using information donated from third party sources in accordance with one or more implementations. For explanatory purposes, the architecture 200 is described as being implemented by the wearable electronic device 110 of FIG. 1, such as by a processor and/or memory of the wearable electronic device 110, and the architecture 202 is described as being implemented by the electronic device 120, such as by a processor and/or memory of the electronic device 120; however, the architecture 200 and/or the architecture 202 may be implemented by any other electronic device(s). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated, for providing recommendations using donated information from applications executing on the wearable electronic device 110, the architecture 200 may be implemented on the wearable electronic device 110. The wearable electronic device 110 includes a relevance engine and recommendation provider 210, one or more wearable device applications 230, database 240, and application data curator 220.

The wearable device applications 230 may donate, using one or more APIs, application data 235 to the database 240. The wearable device applications 230 may include an application, service, widget, or program that is stored locally and/or running on the wearable electronic device 110. The database 240 may store the application data 235 in an index 242. The index 242 may be a searchable index that is accessible by other components of the architecture 200. In an example, the application data 235 includes donated information from the wearable device applications 230. It is further appreciated that the application data 235 may include additional information, other than donated information, which may be stored in the index 242. In an example, information corresponding to the user's current location and/or the current time may be included in the application data 235 and stored in the index 242.

The donated information mentioned above may include information related to recent and/or historical user activity related to a particular wearable device application, and/or information related to content within a particular wearable device application (including user-generated content). Such user activity for a particular wearable device application can include previous actions performed by the user within the particular wearable device application and/or particular information that the developer of the wearable device application has indicated (e.g., tagged) as being included with the donated information. In another example, the donated information further includes future actions to be performed in connection with the particular wearable device application, which may be determined by the particular wearable device application based at least on prior user activity such as a history of similar user activity that occurs on a periodic basis (e.g., buying a particular type of coffee on a daily basis, watching a particular TV show each week, performing the same commute during the weekdays, going to the gym on particular days of the week, reading the news in the evening while at home, etc.). For example, the future actions may indicate a particular location or context (e.g., at home, at the gym, at work, during a commute, etc.) to show a UI element related to the particular wearable device application and/or when to launch the particular wearable device application. Further, the application data 235 may include information corresponding to a location where the user will likely be based on prior user locations and/or scheduling information (e.g., calendar events, meetings, etc.), and wrist detection information for determining a start and an end of the user's day.

Moreover, the user activity may indicate types of interactions (e.g., usage information) with the wearable device application including, for example, a dwell time, tap through and/or scrolling performed by the user. As referred to herein, dwell time corresponds to how long a user hovers over a particular UI element provided by a wearable device application. Scrolling activity may correspond to how far does the user scroll down a list of UI elements provided by one or more wearable device applications. Further, tap through or not activity corresponds to whether a user taps on a UI element or not which indicates whether the user wanted to get more information related to content provided by the UI element.

The architecture 200 includes the application data curator 220 that receives the donated information and/or other information stored in the index 242 based on the application data 235. In one or more implementations, the application data curator 220 may be implemented as a background process (e.g., daemon) executing on the wearable electronic device 110. The application data curator 220 may also proactively track updates to the index 242 and detect updated user activity information and/or other donated information included in the application data 235. In another example, the application data curator 220 may directly receive information (e.g., the user's current location and/or the current time) from the application data 235 (or from the wearable device applications 230) without accessing the index 242. The application data curator 220 provides information regarding user activity and/or other donated information to the relevance engine and recommendation provider 210 to determine relevance scores and recommendations based on a ranking of the relevance scores. Such recommendations may be in the form of respective UI elements that are provided for display on the wearable electronic device 110. In an example, such UI elements are provided as wearable device face tiles that may be presented in manner that the user may interact with the wearable device face tiles (e.g., as discussed further in FIG. 4) through touch input, gestures and/or scrolling, etc.

To determine a relevance score for a particular UI element that may be provided as a recommendation, the relevance engine and recommendation provider 210 may calculate a Gaussian curve for each particular feature where the Gaussian curve indicates an affinity value (e.g., mean of the Gaussian curve) and a confidence value (e.g., variance of the Gaussian curve) of the particular feature. Examples of features, related to different types of inputs, are discussed further below. The relevance score for the particular UI element may be determined based at least in part on a sum of different Gaussian curves for a number of different features and/or other values discussed further below.

The mean of the Gaussian curve discussed above corresponds to value indicating an affinity (e.g., relevance) of the feature to the user. The variance indicates a confidence value of the affinity of the feature to the user. In an example, a positive affinity of a feature may correspond to user behavior such as when the user taps or clicks on a UI element associated with a wearable device application. Additionally, a negative affinity of a feature may correspond to user behavior such as when the user scrolls by, without any additional interaction, the UI element associated with the wearable device application and/or does not tap or click on the UI element. Further, as an example, a high variance of a particular feature indicates that the affinity value (e.g., mean of the Gaussian curve) of the feature has a low confidence, and a low variance of a particular feature indicates that the affinity value of the feature has a high confidence.

Further, the relevance engine and recommendation provider 210 determines a "bias" value for the particular UI element that may be utilized as part of determining the relevance score. The bias value, as used herein, refers to a likelihood or indication that the user will click on or tap the particular UI element when the user is viewing the display of the wearable electronic device 110, and in at least one implementation, is a particular feature that is always included in determining the relevance score for the particular UI element. For determining a final value for the relevance score, the relevance engine and recommendation provider 210 determines a sum of the aforementioned Gaussian curves and the bias value. In one or more implementations, the relevance engine and recommendation provider 210 may utilize a ML model to determine the relevance score in the manner described above. For example, the ML model may implemented using a deep neural network, convolutional network, unsupervised learning technique (e.g., clustering), Bayesian network, hidden Markov model, collaborative filtering, and/or matrix decomposition, and the like.

Some non-limiting examples of the aforementioned features (e.g., that a relevance score may be calculated for) may include information that describes the user's current environment and/or that describes historical or likely user behavior such as a current location of user, current time of day or particular time period of the day (e.g., morning, afternoon evening), recent user activity (e.g., what was the user doing), personal digital assistant information, historical topic information requested or other information searched by user (e.g., stocks, weather, sports, categories of applications, etc.), locally stored user profile information, dwell time, scrolling activity (e.g., how far does the user scroll down a list of UI elements), tap through or not activity (e.g., does a user tap on the UI element), a likelihood that the user will launch an application (e.g., based on information such as prior user activity and a probability calculation), and/or when the user puts on or takes off the wearable device or device (e.g., to determine the beginning and end of a user's typical). The content of a particular UI element may be considered a feature that may be included in the relevance score. Other examples of features can include an application identifier for a particular application, and an identifier for a particular UI element provided by an application.

In at least an implementation, features may be included in different groups. For example, features may be included in either a "generalizing" group, which includes features that are not specific to a particular application(s), or a "memorizing" group that include features specific to a particular application. Further, a particular feature group may include different levels of features. Examples of features included in the generalizing group include features indicating a current location, a current time, and a time period of the day. Examples of features included in the memorizing group include features related to a dwell time, tap through for a particular application, scrolling past a particular application performed by the user, a likelihood that the user will launch an application, an application identifier for a particular application, and a specific time and/or location. Examples of levels of features for the generalizing group may include a first level including features related to time and/or location, and a second level for categories of applications (e.g., business, game, etc.). Examples of levels of features for the memorizing group may include a first level including features related to a specific time and/or specific location, and a second level for features related to particular graphical elements of the particular application.

In an example, when a new UI element (e.g., wearable device face tile) for a particular application is introduced, features included in the generalizing group may be weighted more than other features included in the memorizing group. Initially, for this new UI element, the generalizing features may have lower variances (e.g., indicating greater confidence) in comparison with higher variances (e.g., indicating lower confidence) for the memorizing features. Over time as the user increases interaction to provide additional information related to user activity with the new UI element, the features included in the memorizing group may be weighted more than features included in the generalizing group. Further, in an example, after the user performs an initial action for the new UI element, for each subsequent action on the new UI element, a given feature with a very high variance can be weighted more than another feature with a lower variance. In this manner, the system enables a feature with less confidence to have a greater chance to be explored, and enables another feature with greater confidence to have a greater chance to be exploited.

In one or more implementations, the ML model may be further utilized for adjusting relevance metrics that are utilized for determining relevance scores based on the behavior of the user of the wearable electronic device 110 over time. For example, as new donated information and/or other information is received for one or more features, the relevance engine and recommendation provider 210 may provide the ML model the new donated information and/or other information to adjust a set of constants (e.g., weights) assigned to the feature(s) as discussed above. In another example, the ML model may also adjust a value of a relevance score itself (e.g., boosting). The adjusted constants and/or relevance metric(s) are then passed back to the relevance engine and recommendation provider 210 for adjusting relevance scores where applicable.

The relevance engine and recommendation provider 210, using the respective relevance scores, may rank multiple UI elements (e.g., corresponding to respective recommendations) in accordance with an order from the highest relevance score to the lowest relevance score (or some other appropriate order), and may provide one or more UI elements corresponding to the recommendations for display by the wearable electronic device 110 based on the order of relevance provided by the relevance engine and recommendation provider 210. An example process with respect to ranking UI elements for providing recommendations is described in more detail in FIG. 3 below. An example UI that displays recommendations in the form of different UI elements is described by reference to FIG. 4.

In one or more implementations, based on the rank of UI elements discussed above, the relevance engine and recommendation provider 210 may remove one or more UI elements from display on the wearable electronic device 110. Further, the relevance engine and recommendation provider 210 may also re-display previously removed UI elements at a subsequent time.

As further illustrated, the electronic device 120 (e.g., a mobile smartphone) may implement the architecture 202 for donating information from mobile applications on the electronic device 120, which may be received by the wearable electronic device 110 for providing one or more recommendations. In one or more implementations, the electronic device 120 includes one or more mobile applications 270, database 280, application data curator 250, and suggested actions UI 260.

The mobile applications 270 may donate, using one or more APIs, application data 275 to the database 240. The mobile applications 270 may include an application, service, widget, or program that is stored locally and/or running on the electronic device 120. The database 280 may store the application data 275 in an index 282. The index 282 may be a searchable index that is accessible by other components of the architecture 202. In an example, the application data 275 includes donated information from the mobile applications 270.

The architecture 202 includes the application data curator 250 that receives the donated information and/or other information stored in the index 282 based on the application data 275. In one or more implementations, the application data curator 250 may be implemented as a background process (e.g., daemon) executing on the wearable electronic device 110. The application data curator 250 may also proactively track updates to the index 282 and detect updated user activity information and/or other donated information included in the application data 275. The architecture 202 may work conjunctively with the architecture 200 implemented on the wearable electronic device 110. In at least one implementation, the application data curator 250 provides information regarding user activity and/or other donated information to the application data curator 220 on the wearable electronic device 110 to determine relevance scores and recommendations based on a ranking of the relevance scores for display by the wearable electronic device 110. Further, in an implementation, such recommendations may be received by the application data curator 250 from the wearable electronic device 110 and then provided to the suggested actions UI 260. In an implementation, the suggested actions UI 260 may provide respective recommendations on the display of the electronic device 120 while the device is in a locked mode.

It is appreciated that, in some instances, the architecture 202 of the electronic device 120 may include a particular application that is not available on the wearable electronic device 110. In this example, the application data curator 250 may provide donated information (e.g., from the application data 275) related to a particular action performed by the user on a particular mobile application on the electronic device 120 (e.g., the user orders a particular item on a mobile application that is not available on the wearable electronic device 110) to the application data curator 220 for (potentially) providing as a recommendation by the wearable electronic device 110. Moreover, in some instances, the electronic device 120 does not have to be in proximity to the wearable electronic device 110 when the electronic device 120 is not required to complete the action.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Figure 3:
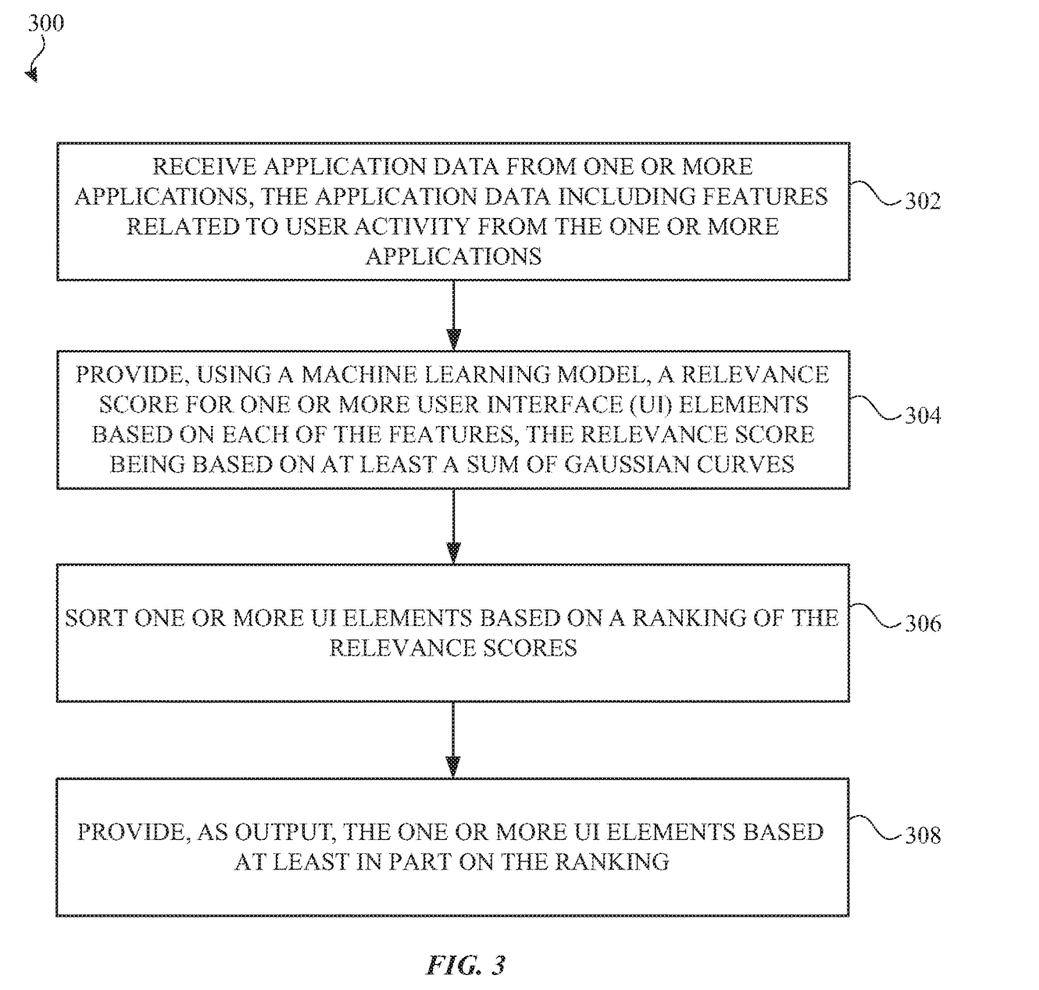
FIG. 3 illustrates a flow diagram of an example process for ranking user interface (UI) elements to provide recommendations in accordance with one or more implementations.

FIG. 3 illustrates a flow diagram of an example process 300 for providing recommendations in accordance with one or more implementations. For explanatory purposes, the process 300 is primarily described herein with reference to the wearable electronic device 110 of FIG. 1. However, the process 300 is not limited to the wearable electronic device 110 of FIG. 1, and one or more blocks (or operations) of the process 300 may be performed by one or more other components of the electronic device 120 and/or by other suitable devices. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

As illustrated in FIG. 3, the wearable electronic device 110 receives application data from one or more applications, the application data including features related to user activity from the one or more applications (302). In an example, the application data may include associated information from applications that are local and/or external to the wearable electronic device 110 (e.g., a wearable device application or a mobile device application) and a set of signals describing a user's current environment or historical user behavior information. The application data may include donated information from such applications as discussed above in FIG. 2, including information of different features, for determining a relevance score, related to UI elements from the applications.

Some non-limiting examples of applications local to the wearable electronic device 110 may include wearable device applications, widgets, or programs, etc., such as the following: calendar, reminders, alarms, timers, stopwatch, weather, stocks, sports, TV shows, maps, turn-by-turn navigation, sunrise, sunset, activity, breathe, fitness, heartbeat information, active workout, commute, news, Internet of things (IoT), home automation, digital wallet, and/or other wearable device applications providing donated information, etc. Applications that are external to the wearable electronic device include mobile applications provided by another device (e.g., the electronic device 120). In another example, the application data may include information related to predicted future actions (e.g., order a different type of coffee based at least on time and/or location). Such future actions may be based on location, context, and/or routine such as when the user is on a commute, when the user is at work, when the user is at the gym, and/or when the user is at home, etc.

Some non-limiting examples of signals may include the following information that describes the user's current environment and/or that describes historical or likely user behavior: current location of user, current time of day, recent user activity (e.g., what was the user doing), personal digital assistant information, biometric data (e.g., the user's heart-rate), historical topic information requested or other information searched by user (e.g., stocks, weather, sports, categories of applications, etc.), locally stored user profile information, dwell time (e.g., how long a user hovers over a data item in a watch implementation), scrolling activity (e.g., how far does the user scroll down the list of elements), tap through or not activity (e.g., does a user tap on the element), a likelihood that user will launch an application (e.g., based on information such as prior user activity and a probability calculation), and/or when the user puts on or takes off the watch or device (e.g., to determine the beginning and end of a user's typical).

The wearable electronic device 110 provides, using a ML model, a relevance score for one or more user interface (UI) elements based on each of the features (304). As discussed in FIG. 2, a Gaussian curve for each particular feature may be determined where the Gaussian curve indicates an affinity value (e.g., mean of the Gaussian curve) and a confidence value (e.g., variance of the Gaussian curve) of the particular feature. The relevance score for the particular UI element may be determined based at least in part on a sum of different Gaussian curves for a number of different features and/or other values. Examples of signals related to features that could affect the relevance score include an order that the user launches one or more apps on the device and an importance of a UI element based on other factors (e.g., important person in a calendar invite). In a touch interface implementation, the wearable electronic device 110 tracks prior activity and if the user shows a history of not tapping or interacting with a UI element, that UI element can be scored lower. Further, the wearable electronic device 110 may also determine (e.g., using a sensor detecting motion) when the user is looking at the screen of the wearable electronic device 110 but does not interact with a UI element, and can decrease the score for the UI element. Similarly, when the wearable electronic device detects that the user is looking at the screen and does interact with a UI element, the score for the UI element may be increased. Scores may be dynamically updated/recalculated as new signals are received. These new signals may be fed into the ML model to adjust the final relevance score as described above. Moreover, as discussed in FIG. 2, respective weights for features may be adjusted over time which can affect the relevance score.

The wearable electronic device 110 sorts/ranks the UI elements based on the relevance score for each UI element (306). For example, sorting can be by score and chronology (time). In another example, other sorting schemes (e.g., from least relevant to most (reverse relevance ordering)) may be used. The wearable electronic device 110 provides, as output, the one or more UI elements based at least in part on the ranking (308). In an example, the output is provided to the wearable electronic device 110 for rendering the UI to the user (described in more detail in FIG. 4 below). In one example, the output may be provided while the wearable electronic device 110 is in a locked mode. In another example, the output can be in an auditory format, (e.g. personal digital assistant). In yet another example, the output can be in a text format (e.g., messaging application).

Figure 4:
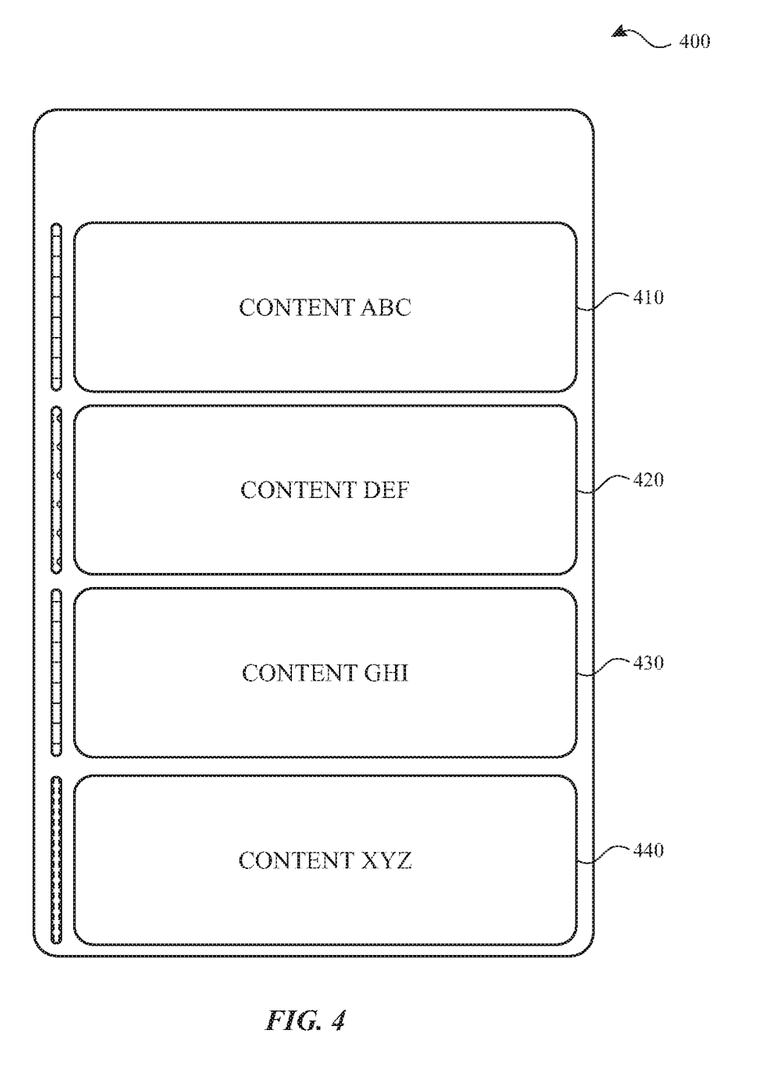
FIG. 4 illustrates an example graphical user interface displaying recommendations in the form of respective user interface elements in accordance with one or more implementations.

FIG. 4 illustrates an example graphical user interface for displaying ranked data items in accordance with one or more implementations. The relevance engine and recommendation provider 210 of the wearable electronic device 110 may provide for display a user interface 400 for presenting UI elements 410, 420, 430, and 440, which may include respective content therein for display. In one or more implementations, the UI elements 410, 420, 430, 440 may each be a respective wearable device face tile displayed by the wearable electronic device 110 based at least on donated information and/or other information from the application data (e.g., the application data 235, the application data 275). Each UI element may have a different relevance score, and the relevance scores are ranked by the relevance engine and recommendation provider 210. In this example, the UI elements 410, 420, 430, and 440 are sorted from highest relevance score to lowest relevance score. However, it is appreciated that the UI elements 410, 420, 430, and 440 may be sorted in a different order(s) than the example shown in FIG. 4. Further, relevance engine and recommendation provider 210 may concurrently display any number of the ranked data items (or subset thereof) even though, for purposes of explanation, four UI elements are shown in FIG. 4.

Figure 5:
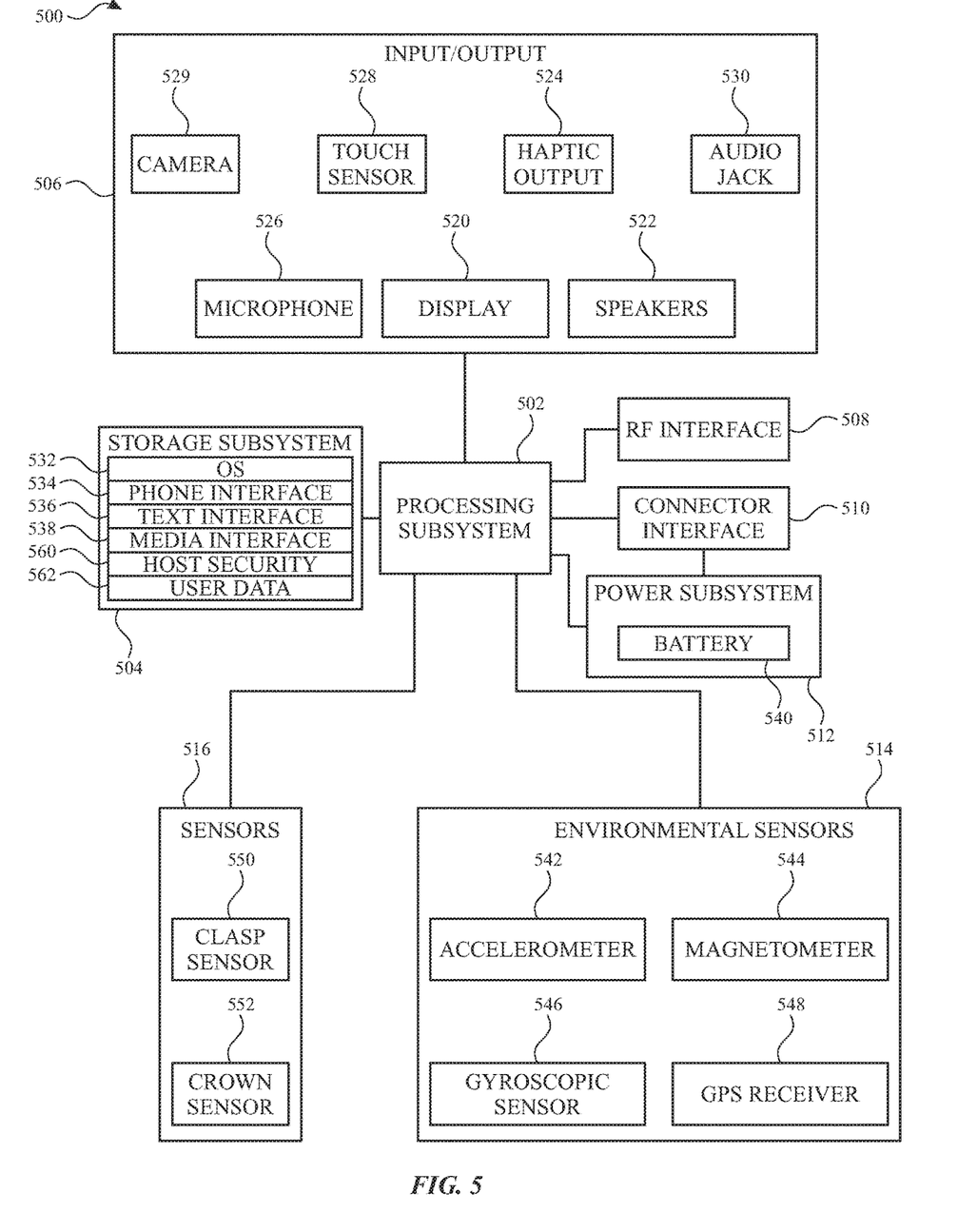
FIG. 5 is an example block diagram of a device (e.g., a wearable device) with which one or more implementations of the subject technology may be implemented.

FIG. 5 is an example block diagram of a wearable device 500 (e.g., a smart watch) according to one or more implementations of the subject technology. The wearable device 500 can be, and/or can be a part of, the wearable electronic device 110 shown in FIG. 1. Wearable device 500 can include processing subsystem 502, storage subsystem 504, input/output 506, RF interface 508, connector interface 510, power subsystem 512, environmental sensors 514, and strap sensors 516. Wearable device 500 can also include other components (not explicitly shown).

In many implementations, the wearable device 500 may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 504 can be implemented, e.g., using magnetic storage media, flash memory, other semiconductor memory (e.g., DRAM, SRAM), or any other non-transitory storage medium, or a combination of media, and can include volatile and/or non-volatile media. In some implementations, storage subsystem 504 can store media items such as audio files, video files, image or artwork files; information about a user's contacts (names, addresses, phone numbers, etc.); information about a user's scheduled appointments and events; notes; and/or other types of information, examples of which are described below. In some implementations, storage subsystem 504 can also store one or more application programs to be executed by processing subsystem 502 (e.g., video game programs, personal information management programs, media playback programs, interface programs associated with particular host devices and/or host device functionalities, etc.).

Input/output 506 can include any combination of input and output devices. A user can operate input devices of input/output 506 to invoke the functionality of wearable device 500 and can view, hear, and/or otherwise experience output from wearable device 500 via output devices of input/output 506.

Examples of output devices include display 520, speakers 522, and haptic output generator 524. Display 520 can be implemented using compact display technologies, e.g., LCD (liquid crystal display), LED (light-emitting diode), OLED (organic light-emitting diode), or the like. In some implementations, display 520 can incorporate a flexible display element or curved-glass display element, allowing wearable device 500 to conform to a desired shape. One or more speakers 522 can be provided using small-form-factor speaker technologies, including any technology capable of converting electronic signals into audible sound waves. In some implementations, speakers 522 can be used to produce tones (e.g., beeping or ringing) and can but need not be capable of reproducing sounds such as speech or music with any particular degree of fidelity. Haptic output generator 524 can be, e.g., a device that converts electronic signals into vibrations; in some implementations, the vibrations can be strong enough to be felt by a user wearing wearable device 500 but not so strong as to produce distinct sounds.

Examples of input devices include microphone 526, touch sensor 528, and camera 529. Microphone 526 can include any device that converts sound waves into electronic signals. In some implementations, microphone 526 can be sufficiently sensitive to provide a representation of specific words spoken by a user; in other implementations, microphone 526 can be usable to provide indications of general ambient sound levels without necessarily providing a high-quality electronic representation of specific sounds.

Touch sensor 528 can include, e.g., a capacitive sensor array with the ability to localize contacts to a particular point or region on the surface of the sensor and in some instances, the ability to distinguish multiple simultaneous contacts. In some implementations, touch sensor 528 can be overlaid over display 520 to provide a touchscreen interface, and processing subsystem 502 can translate touch events (including taps and/or other gestures made with one or more contacts) into specific user inputs depending on what is currently displayed on display 520. In some implementations, touch sensor 528 can also determine a location of a touch on the cover glass. A touch sensor may be incorporated into or on the display stack in order to determine a location of a touch. The touch sensor may be self-capacitive in certain implementations, mutual-capacitive in others, or a combination thereof.

Camera 529 can include, e.g., a compact digital camera that includes an image sensor such as a CMOS sensor and optical components (e.g., lenses) arranged to focus an image onto the image sensor, along with control logic operable to use the imaging components to capture and store still and/or video images. Images can be stored, e.g., in storage subsystem 504 and/or transmitted by wearable device 500 to other devices for storage. Depending on implementation, the optical components can provide fixed focal distance or variable focal distance; in the latter case, autofocus can be provided. Zero, one, or more cameras can be provided, depending on implementation.

In some implementations, input/output 506 can provide output to and/or receive input from an auxiliary device such as a headset. For example, audio jack 530 can connect via an audio cable (e.g., a standard 2.5-mm or 3.5-mm audio cable) to an auxiliary device. Audio jack 530 can include input and/or output paths. Accordingly, audio jack 530 can provide audio to the auxiliary device and/or receive audio from the auxiliary device. In some implementations, a wireless connection interface can be used to communicate with an auxiliary device.

Processing subsystem 502 can be implemented as any electronic device capable of processing, receiving, or transmitting data or instructions. Processing subsystem 502 can include one or more integrated circuits. For example, processing subsystem 502 may include one or more of: one or more single-core or multi-core microprocessors or microcontrollers, a central processing unit (CPU), an application-specific integrated circuit (ASIC), a digital signal processor (DSP), or additional combinations of such devices. In operation, processing subsystem 502 can control the operation of wearable device 500. In various implementations, processing subsystem 502 can execute a variety of programs in response to program code and can maintain multiple concurrently executing programs or processes. At any given time, some or all of the program code to be executed can be resident in processing subsystem 502 and/or in storage media such as storage subsystem 504.

Through suitable programming, processing subsystem 502 can provide various functionality for wearable device 500. For example, in some implementations, processing subsystem 502 can execute an operating system (OS) 532 and various applications for interfacing with a host device, such as a phone-interface application 534, a text-interface application 536, and/or a media interface application 538.

In some implementations, processing subsystem 502 can also execute a host security process 560 that provides support for establishing and maintaining a verified communication session with a host device. User data 562 can include any information specific to a user, such as identification information, user-specified settings and preferences, customized information (e.g., contacts, predefined text messages), and any other user-related data or content.

RF (radio frequency) interface 508 can allow wearable device 500 to communicate wirelessly with various host devices. RF interface 508 can include RF transceiver components such as an antenna and supporting circuitry to enable data communication over a wireless medium, e.g., using Wi-Fi (IEEE 502.5 family standards), Bluetooth® (a family of standards promulgated by Bluetooth SIG, Inc.), or other protocols for wireless data communication. RF interface 508 can be implemented using a combination of hardware (e.g., driver circuits, antennas, modulators/demodulators, encoders/decoders, and other analog and/or digital signal processing circuits) and software components. In some implementations, RF interface 508 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 508.

Connector interface 510 can allow wearable device 500 to communicate with various host devices via a wired communication path, e.g., using Universal Serial Bus (USB), universal asynchronous receiver/transmitter (UART), or other protocols for wired data communication. In some implementations, connector interface 510 can provide a power port, allowing wearable device 500 to receive power, e.g., to charge an internal battery. For example, connector interface 510 can include a connector such as a mini-USB connector or a custom connector, as well as supporting circuitry.

Environmental sensors 514 can include various electronic, mechanical, electromechanical, optical, or other devices that provide information related to external conditions around wearable device 500. Sensors 514 in some implementations can provide digital signals to processing subsystem 502, e.g., on a streaming basis or in response to polling by processing subsystem 502 as desired. Any type and combination of environmental sensors can be used; shown by way of example are accelerometer 542, a magnetometer 544, a gyroscope sensor 546, and a GPS receiver 548.

Sensors 516 can include various electronic, mechanical, electromechanical, optical, or other devices that provide information to wearable device 500, such as clasp sensor 550 that can detect when clasp members are engaged with each other or disengaged from each other. As another example, one or more crown sensors 552 can be disposed to detect input from a crown. Crown sensors 552 can also include motion sensors, accelerometers, pressure sensors (e.g., piezoelectric devices), or the like.

Power subsystem 512 can provide power and power management capabilities for wearable device 500. For example, power subsystem 512 can include a battery 540 (e.g., a rechargeable battery) and associated circuitry to distribute power from battery 540 to other components of wearable device 500 that require electrical power. In some implementations, power subsystem 512 can also include circuitry operable to charge battery 540, e.g., when connector interface 510 is connected to a power source. In some implementations, power subsystem 512 can include a "wireless" charger, such as an inductive charger, to charge battery 540 without relying on connector interface 510. An inductive charging base may transmit power to an inductive receiver within the device in order to charge a battery of the device.

It will be appreciated that wearable device 500 is illustrative and that variations and modifications are possible.

Figure 6:
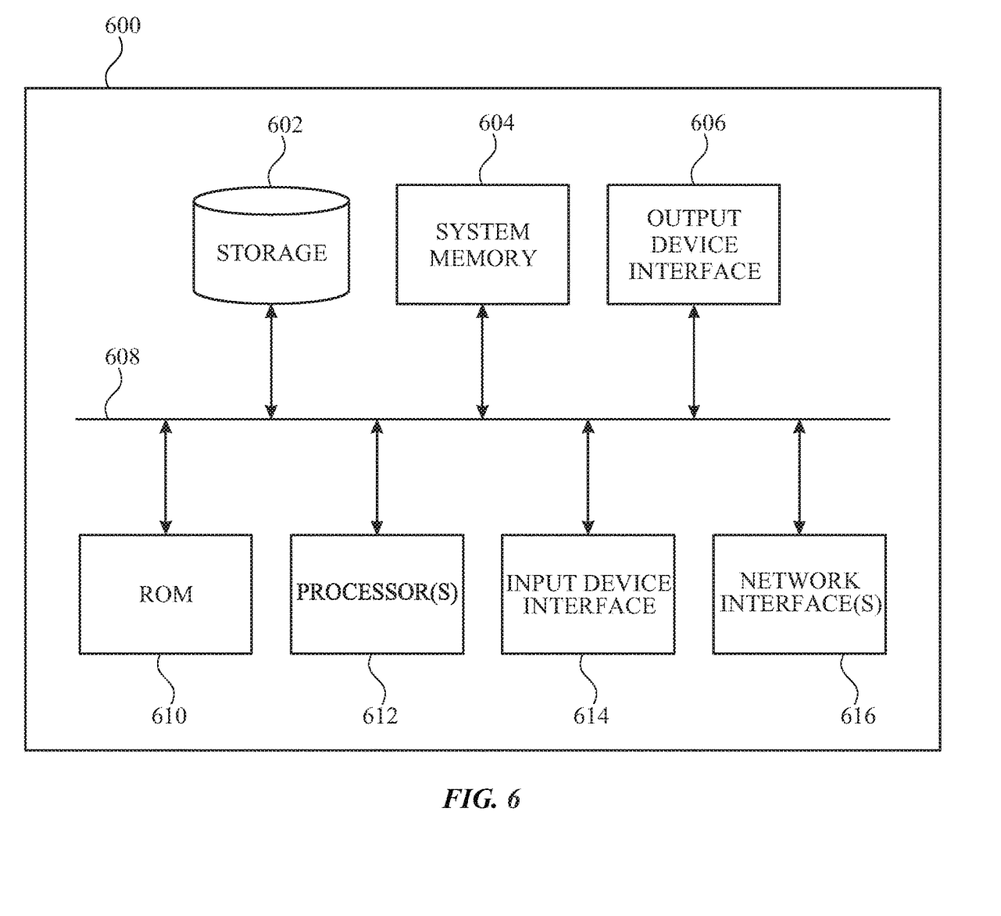
FIG. 6 illustrates an electronic system with which one or more implementations of the subject technology may be implemented.

FIG. 6 illustrates an electronic system 600 with which one or more implementations of the subject technology may be implemented. The electronic system 600 can be, and/or can be a part of, the electronic device 120, and/or the server 130 shown in FIG. 1. The electronic system 600 may include various types of computer readable media and interfaces for various other types of computer readable media. The electronic system 600 includes a bus 608, one or more processing unit(s) 612, a system memory 604 (and/or buffer), a ROM 610, a permanent storage device 602, an input device interface 614, an output device interface 606, and one or more network interfaces 616, or subsets and variations thereof.

The bus 608 collectively represents all system, peripheral, and chipset buses that communicatively connect the numerous internal devices of the electronic system 600. In one or more implementations, the bus 608 communicatively connects the one or more processing unit(s) 612 with the ROM 610, the system memory 604, and the permanent storage device 602. From these various memory units, the one or more processing unit(s) 612 retrieves instructions to execute and data to process in order to execute the processes of the subject disclosure. The one or more processing unit(s) 612 can be a single processor or a multi-core processor in different implementations.

The ROM 610 stores static data and instructions that are needed by the one or more processing unit(s) 612 and other modules of the electronic system 600. The permanent storage device 602, on the other hand, may be a read-and-write memory device. The permanent storage device 602 may be a non-volatile memory unit that stores instructions and data even when the electronic system 600 is off. In one or more implementations, a mass-storage device (such as a magnetic or optical disk and its corresponding disk drive) may be used as the permanent storage device 602.

In one or more implementations, a removable storage device (such as a floppy disk, flash drive, and its corresponding disk drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 612 may need at runtime. In one or more implementations, the processes of the subject disclosure are stored in the system memory 604, the permanent storage device 602, and/or the ROM 610. From these various memory units, the one or more processing unit(s) 612 retrieves instructions to execute and data to process in order to execute the processes of one or more implementations.

The bus 608 also connects to the input and output device interfaces 614 and 606. The input device interface 614 enables a user to communicate information and select commands to the electronic system 600. Input devices that may be used with the input device interface 614 may include, for example, alphanumeric keyboards and pointing devices (also called "cursor control devices"). The output device interface 606 may enable, for example, the display of images generated by electronic system 600. Output devices that may be used with the output device interface 606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 608 also couples the electronic system 600 to one or more networks and/or to one or more network nodes, such as the electronic device 120 shown in FIG. 1, through the one or more network interface(s) 616. In this manner, the electronic system 600 can be a part of a network of computers (such as a LAN, a wide area network ("WAN"), or an Intranet, or a network of networks, such as the Internet. Any or all components of the electronic system 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
    a memory; and
    at least one processor configured to:
        receive application data from one or more applications, the application data including features related to user activity from the one or more applications, the one or more applications including applications local to the device that are stored in the memory and applications external to the device;
        provide, using a machine learning (ML) model, a relevance score for each of one or more user interface (UI) elements based on each of the features, wherein the relevance score is based at least in part on weights assigned to features based on the user activity and respective variance values of the features;
        sort one or more UI elements based on a ranking of the relevance scores; and
        provide, as output, the one or more UI elements based at least in part on the ranking.

2. The device of claim 1, wherein the relevance score is based at least in part on a sum of respective Gaussian curves.

3. The device of claim 1, wherein the relevance score is further based on a value indicating a likelihood that a user will click on or tap a particular UI element.

4. The device of claim 1, wherein a first variance value of a first feature indicates a first confidence associated with the first feature, and a second variance value of a second feature indicates a second confidence associated with the second feature, wherein the first variance value is higher than the second variance value indicating that the first confidence is lower than the second confidence, and wherein the first feature is assigned a greater weight than the second feature for providing the relevance score.

5. The device of claim 1, wherein the features include a signal based on a location or time.

6. The device of claim 1, wherein the application data is provided by the one or more applications using one or more application programming interfaces.

7. The device of claim 1, wherein the weights assigned to features are adjusted over time as new application data related to user activity is received.

8. The device of claim 1, wherein the features are included in different groups.

9. The device of claim 8, wherein the different groups include a group of features that are shared across the applications and a second group of features that are specific to a particular application.

10. The device of claim 8, wherein the device comprises a wearable electronic device and each UI element is provided for display by the wearable electronic device in accordance with the ranking, and wherein the each UI element corresponds to a watch face graphical element.

11. A method comprising:
    receiving application data from one or more applications, the application data including features related to user activity from the one or more applications, the one or more applications including applications local to a device and applications external to the device;
    providing, using a machine learning (ML) model, a relevance score for each of one or more user interface (UI) elements based on each of the features, wherein the relevance score is based at least in part on weights assigned to features based on the user activity and respective variance values of the features;
    sorting one or more UI elements based on a ranking of the relevance scores; and
    providing, as output, the one or more UI elements based at least in part on the ranking.

12. The method of claim 11, wherein the device is a first device, and wherein the applications external to the device comprise applications that have run on a second device that is associated with the first device.

13. The method of claim 12, wherein the first device is a wearable electronic device that works in conjunction with the second device.

14. A computer program product comprising code stored in a non-transitory computer-readable storage medium, the code comprising:
    code to receive application data from one or more applications, the application data including features related to user activity from the one or more applications, the one or more applications including applications local to a device and applications external to the device;
    code to provide, using a machine learning (ML) model, a relevance score for each of one or more user interface (UI) elements based on each of the features, wherein the relevance score is based at least in part on weights assigned to features based on the user activity and respective variance values of the features;
    code to sort one or more UI elements based on a ranking of the relevance scores; and
    code to provide, as output, the one or more UI elements based at least in part on the ranking.

15. The device of claim 1, wherein the device is a first device, and wherein the applications external to the device comprise applications that have run on a second device that is associated with the first device.

16. The device of claim 15, wherein the first device comprises a wearable electronic device, and wherein the second device comprises a portable computing device.

17. The device of claim 16, wherein the wearable electronic device comprises a smart watch, and wherein the portable computing device comprises a smartphone, a tablet device, or a laptop computer.

18. The device of claim 15, wherein each of the UI elements is a UI element associated with at least one of the one or more applications.

19. The device of claim 18, further comprising a display, wherein the at least one processor is configured to provide the output by displaying, on the display, a scrollable list of the one or more UI elements in an order determined based on the sorting of the one or more UI elements.

20. The computer program product of claim 14, wherein the device is a first device, and wherein the applications external to the device comprise applications that have run on a second device that is associated with a same user account as the first device.

* * * * *